Figure 1:
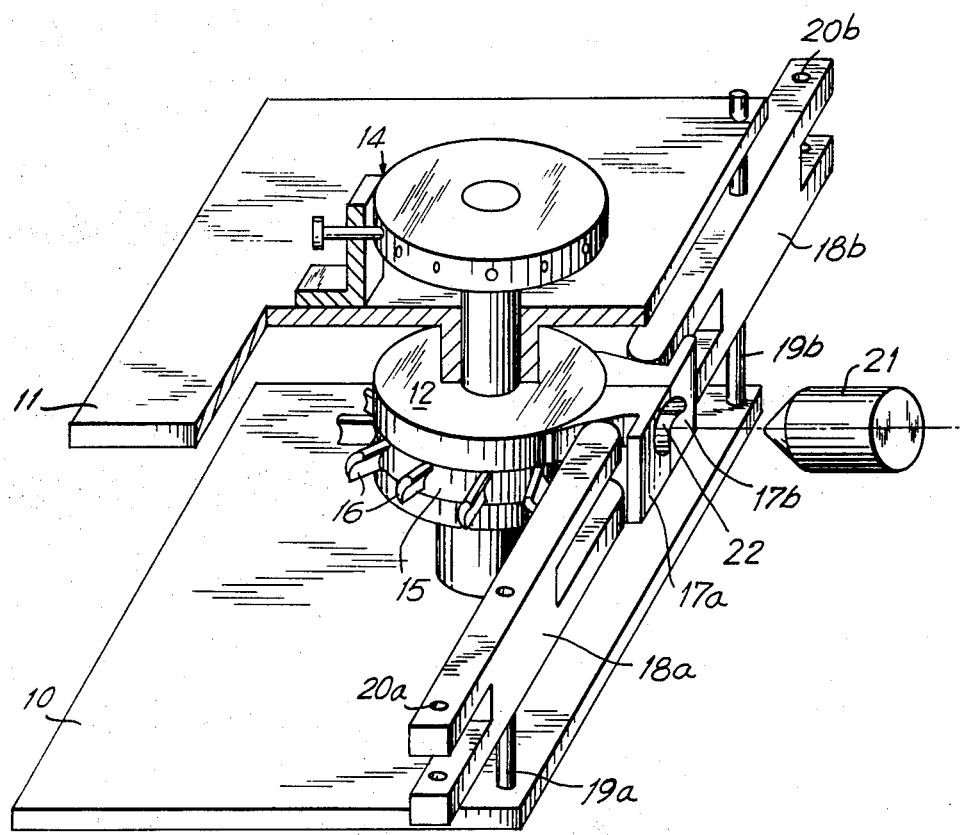

United States Patent [19]
Perisse

[11] 3,766,966
[45] Oct. 23, 1973

[54] APPARATUS FOR THE MANUFACTURE OF PATTERNS OR MODELS OF SYNTHETIC MATERIAL FOR PRECISION FOUNDRY CASTINGS

[76] Inventor: Pierre Perisse, Riorimas, Haute-Garonne, France

[22] Filed: Feb. 22, 1971

[21] Appl. No.: 117,804

Related U.S. Application Data

[60] Division of Ser. No. 711,112, is a continuation-in-part of Ser. No. 573,925, Aug. 22, 1966, abandoned.

[52] U.S. Cl. ............... 164/249, 164/235, 425/127, 425/129
[51] Int. Cl. ........................... B29f 1/10, B22c 7/02
[58] Field of Search ............... 164/45, 235, 249, 164/94, 98, 100; 425/110, 116, 117, 121, 127, 129, 126

[56] References Cited
UNITED STATES PATENTS

| | | |
|---|---|---|
| 3,271,813 | 9/1966 | Gernandt et al. ............... 425/116 X |
| 2,997,742 | 8/1961 | Mieville ............... 425/129 |
| 2,282,308 | 5/1942 | Dahlin ............... 425/121 |
| 3,334,409 | 8/1967 | Schneider ............... 264/135 X |

*Primary Examiner*—J. Spencer Overholser
*Assistant Examiner*—David S. Safran
*Attorney*—Waters, Roditi, Schwartz & Nissen

[57] ABSTRACT

An apparatus for manufacturing blade wheel patterns from synthetic material in which a hub of a pattern to be manufactured is intermittently rotated to bring the locations at which the blades are to be affixed adjacent a molding station. A two-part mold is supported at the molding station by respective crank arms which are periodically operated first to apply the mold parts together on the hub of the pattern so that synthetic material can be injected into a molding cavity in the parts to form a blade affixed on the surface of the hub and second to separate the mold parts and lift them away from the surface of the hub so that the hub with the blade thereon can now be rotated to bring the next location at which a blade is to be affixed to the mold station.

4 Claims, 4 Drawing Figures

APPARATUS FOR THE MANUFACTURE OF PATTERNS OR MODELS OF SYNTHETIC MATERIAL FOR PRECISION FOUNDRY CASTINGS

The present application is a division of application Ser. No. 711,112 filed Mar. 3, 1968 and now abandoned which in turn is a Continuation-in-part of application Ser. No. 573,925 filed on Aug. 22, 1966 and now abandoned. The application relates to the manufacture of patterns in synthetic material of blade-wheels.

It is known to manufacture metal parts of high precision by pouring the constituent material in the molten state into moulds prepared from patterns of wax or of thermoplastic material of the said parts.

This method, known as the "lost-wax process" necessitates the preparation of patterns which reproduce to their smallest details the characteristics of the parts which it is desired to manufacture, and when these parts are complicated, the preparation of the patterns necessitates long and laborious operations.

The application of this method to the manufacture of fixed or moving blade-wheels, intended for the equipment small gas-turbines for example, especially presents problems which are particularly difficult to solve.

In fact, on the one hand, wheels of this kind comprise a large number of identical blades which are sometimes twisted; on the other hand, the blades must be coupled at regular intervals and under identical conditions to a single rim and, when so required — in the case of wheels with fixed blades or "distributors" — to a second element concentric with said rim.

In the case of blades having a straight profile, it is possible to produce an injection mould comprising as many "daggers," that is to say elements corresponding to the spaces between the blades, as there are blades, these daggers being extracted radially so as to permit the de-moulding of the pattern after injection. It is thus possible to obtain a pattern in one single injection.

In the case of twisted profiles, it is much more difficult to produce moulds similar to those previously described, and another method consists of producing the injection mould of a blade, the blades separately injected being then fixed on the rim, but by reason of the precision required, these operations are very long and very costly.

Finally, in the case of distributors comprising an external ring, it is necessary to produce the pattern in two parts which are subsequently assembled together. The first part is constituted by the rim and the blades, the second by the external ring. In consequence, in addition to the problems already encountered for the wheels, there is presented the problem of coupling together the extremities of the blades and the outer ring.

An object of the invention is to provide apparatus for the manufacture of patterns of synthetic material of blade-wheels, which is simple and of low cost.

The method according to the invention consists essentially of manufacturing, by means known per se a pattern with a rim; of then coating the said rim pattern with an adhesive material at a plurality of positions corresponding to the positions of the blades of the said blade-wheel; of successively applying against the said rim pattern, at each of the said positions, a mould of a pattern of the said blades, the said mould having a shape such that it is intimately applied against the said rim, and comprising a moulding cavity such that a material in the fluid state introduced into the said cavity comes into contact with the said rim at each of the said positions; of introducing successively into the said mould a synthetic material in the fluid state, said material being capable of being solidifed by appropriate means; of causing the solidification of said material by the said means so as to obtain at each of the said positions a solid pattern of a blade which adheres to the said rim through the intermediary of said adhesive material; and finally separating the said mould from the said blade pattern.

The mould employed will advantageously be constituted by two half-moulds comprising recesses which, after assembly of the said half-moulds, form a cavity having a profile complementary to that of the blade pattern to be produced, and which communicates with the exterior by an orifice formed in the part of the said mould which is in contact with the said rim.

The synthetic material employed will advantageously be constituted by a liquid material capable of producing a solid polymer when there is added thereto a suitable polymerization catalyst which will be mixed with it before introduction into the mould, or by a thermoplastic material which is introduced while hot into the mould and which solidifies on cooling.

Figure 2:
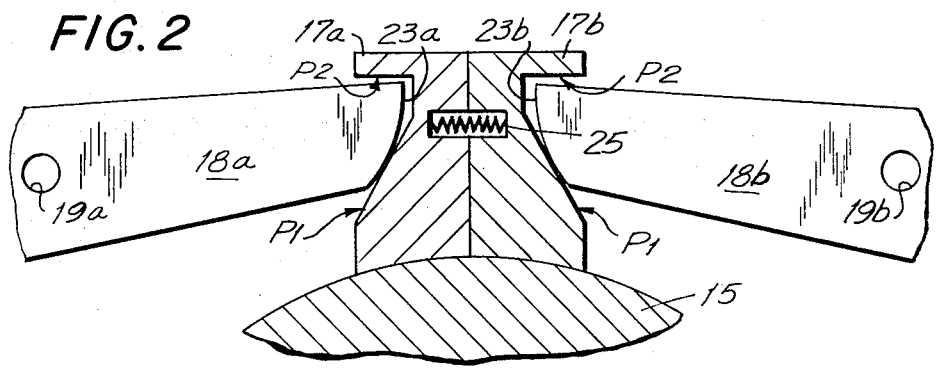
Figure 3:
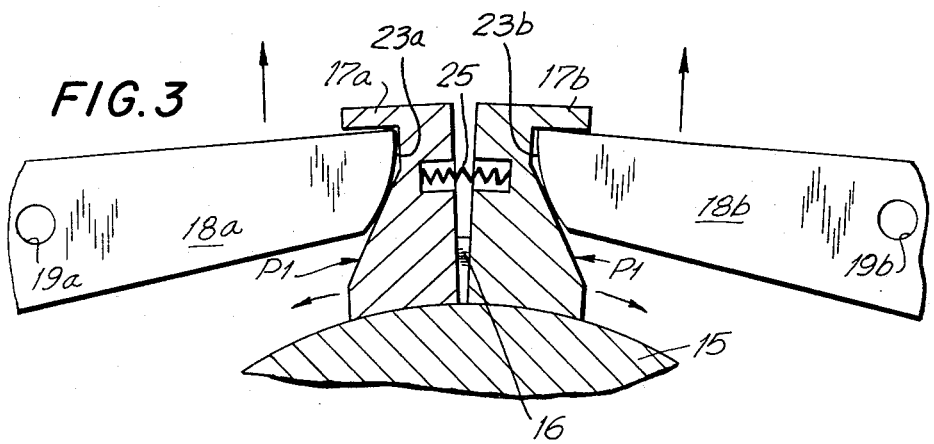
Figure 4:
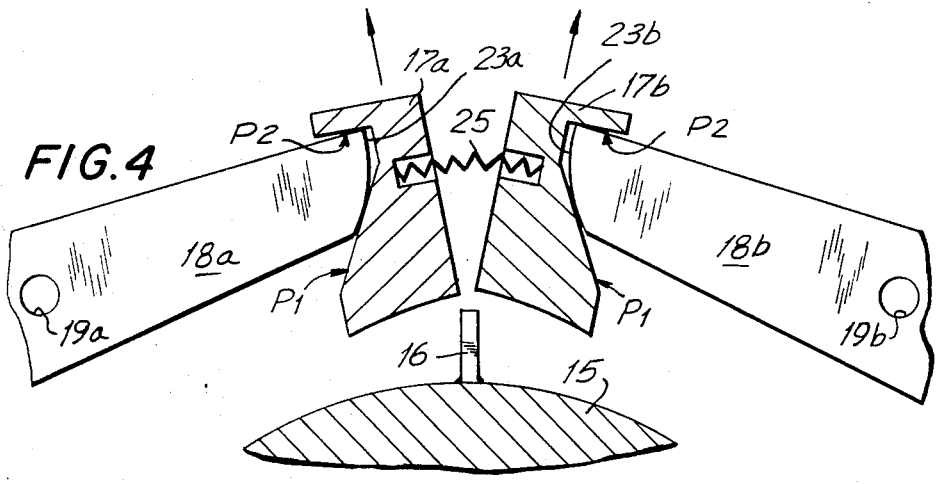

One embodiment according to the invention for carrying this method into effect will now be described below, by way of nonlimitative examples, reference being made to the accompanying drawings, in which:

FIG.1 is a diagrammatic view in perspective of the device according to the invention; and FIGS.2, 3 and 4 are diagrammatic detail views illustrating different stages of opening of the moulds of the device.

The equipment shown in FIG.1 comprises a frame in two parts 10 and 11, on which is mounted a shaft 13, movable in rotation with respect to this frame. On a cylindrical support 12 rigidly fixed to the shaft 13, is fixed a rim pattern 15, on which it is desired to fix rigidly, in a plurality of respective positions, a plurality of blade patterns. A divider 14 of known type, carried by the portion 11 of the frame, enables the rim 15 to be brought accurately into each of the successive positions corresponding to the positions in which the blade patterns 16 are to be simultaneously moulded and fixed on the rim.

These patterns are moulded by means of two half-moulds 17a and 17b, the base of which conforms to the shape of the outer surface of the rim 15. The half-moulds 17a and 17b comprise recesses which, when the half-moulds are assembled together to form the mould, define a cavity 22 having a profile complementary to that of the blades 16. When the half-moulds 17a and 17b are assembled together, the base of this cavity is closed by the rim 15.

The displacement of each half-mould 17a, 17b is actuated, in a manner which will be described in detail later, by a crank-arm, 18a, 18b respectively, articulated on the portion 10 of the frame by a shaft 19a, 19b, respectively. The two crank-arms are operated in turn, in known manner, by a single jack (not shown) through the intermediary of a connecting-rod system (also not shown) operating respectively at 20a and 20b the extremities of the crank-arms 18a and 18b opposite the half-moulds 17a, 17b.

An injection device for a liquid hardening synthetic material of known type, of which only the nozzle 21 has been shown, is arranged opposite the cavity 22 of the mould, formed by the two half-moulds 18a, 18b.

A glueing system of known type (not shown) is also provided for the purpose of applying a coating of adhesive material to the surface of the rim 15 at each of the positions in which the blade patterns 16 are to be moulded and fixed.

Before describing the movement of the half-moulds 18a and 18b, it will be recalled that the invention consists of bringing the rim 15 into a position at which the mould formed by the two half-moulds assembled together, permits a blade 16 to be moulded and fixed on the rim at one of the pre-determined positions, then assembling the half-moulds together, injecting into the cavity 22 a hardening synthetic material in the liquid state, causing the solidification of the said material inside the said mould, and finally separating the half-moulds.

The movement of the two half-moulds will now be described in detail with reference to FIGS.2 to 4.

The half-moulds 17a and 17b are in mutual contact in the closed position of the mould along a flat face, while they are provided at the rear with a recess 23a and 23b, in which is engaged the rounded extremity of the corresponding crank-arm, 18a and 18b respectively. Each recess comprises a flat surface $P_1$ directed obliquely with respect to the surface of the rim 15 and to the flat contact surface of the half-moulds, so that in the position of closure (see FIG.2), the crank-arms 18a and 18b come into contact with the surfaces $P_1$ and thus apply the half-moulds against each other and against the rim 15.

The recesses 23a and 23b also comprise a surface $P_2$ substantially perpendicular to the flat surface of contact of the half-moulds. The surface $P_2$ is separated from the crank-arms 18a and 18b in the position of closure of the half-moulds, but comes into contact with the said crank-arms when they pivot about their respective shafts 19a and 19b under the action of the jack which controls their movements.

At the beginning of this movement (see FIG.3), the half-moulds are pushed away from each other by a spring 25 interposed between them and move apart, while remaining applied against the rim 15, completely freeing the blade 26 which has just been moulded. The spring 25 could of course be replaced by an equivalent elastic system.

When the blade has been sufficiently liberated (see FIG.4), the crank-arms 18a and 18b, continuing their movement of rotation, come into contact with the surface $P_2$ and lift the half-moulds 17a and 17b which move away from the rim 15 so that the latter can then be pivoted so as to begin a fresh cycle.

It is clear that the shape of the recesses 23a and 23b can be modified in various ways so as to obtain pre-determined opening and closure of the half-moulds. It is also clear that for this same purpose, it is possible to modify the relative positions of the rim 15 and the pivotal shafts 19a and 19b in order to provide a guiding of the half-moulds and to compel them to follow a pre-determined trajectory of opening.

During the closure of the half-moulds, their movement and that of the crank-arms take place in the direction opposite to those which have just been described.

What I claim is:

1. Apparatus for the manufacture of patterns for blade wheels for synthetic material, said apparatus comprising a rotatable shaft, means for supporting on said shaft an annular rim which is to serve as the hub of a blade wheel pattern, means for rotating said shaft and said rim thereon, means for positioning said shaft in angular positions corresponding to locations at which blades are to be applied to said rim, the rim having adhesive applied thereto at the locations whereat the blades are to be applied, a mould adjacent said rim and constituted by two parts one movable with respect to the other, said mould having an external shape permitting it to be intimately applied against said rim, said parts of said mould having respective external recesses cooperatively defining a moulding cavity with a profile corresponding to that of a blade when said parts are assembled together, said cavity communicating with the exterior, on the one hand by a first orifice closed by said rim during the moulding operation and on the other hand, by a second orifice through which a moudable material can be introduced into said cavity; means arranged opposite said cavity of said mould at the time of the moulding operation for injecting said moudable material into said cavity via said second orifice and means for controlling the relative movements of said parts of said mould one with respect to the other so as to (a) assemble them together and apply them intimately against said rim before the moulding operation and (b) separate them from each other and from the rim after the moulding operation, each part of said mould having a face applied against the corresponding face of the other part of said mould during the course of the moulding operation, said external recess in each of said parts forming the molding cavity being formed in said face, a second recess being formed in each of said parts at the rear of said parts opposite said face, said means for controlling the relative movement of said parts of said mould being engaged in the rear recesses of said parts of said mould and being articulated on a fixed frame, and means for actuating the means which controls the relative movement of said parts to pivot on said fixed frame.

2. Apparatus as claimed in claim 1, in which each face of said mould applied against the corresponding face of the other part of said mould during the course of the moulding operation is substantially flat, said means for controlling the relative movement of said parts of said mould comprising two crank-arms, each of which has a first extremity engaged in a respective rear recess of one of said parts of said mould, each crank-arm being articulated on the fixed frame, the actuating means being connected to a second extremity of said crank-arm to cause said crank-arm to pivot about its articulation on said fixed frame.

3. Apparatus as claimed in claim 1, in which each face of said mould applied against the corresponding face of the other part of said mould during the course of the moulding operation is substantially flat, each rear recess having a first substantially flat bounding surface directed obliquely with respect to the portion of the surface of said rim in contact with said mould during the moulding operation, and a second bounding surface extending substantially perpendicularly to said flat face of the respective part of said mould, said means for controlling the relative movement of said parts of said mould comprising two crank-arms, each of which has a first extremity engaged in a respective rear recess of one of said parts of said mould, each crank-arm being articulated on the fixed frame, the actuating means being connected to a second extremity of each said crank-arm to cause said crank-arm to pivot about its articulation on said fixed frame, said first extremity of each said crank-arm being rounded and being in contact with said first surface of the corresponding part of said mould during the course of the moulding operation and coming into contact with said second surface of said rear recess during the course of the opening operation of said mould.

4. Apparatus as claimed in claim 1, comprising means interposed between said parts of the mold for urging said parts apart.

* * * * *